United States Patent
Shin et al.

(10) Patent No.: US 12,362,393 B2
(45) Date of Patent: Jul. 15, 2025

(54) ELECTROLYTE FOR LITHIUM-ION BATTERIES WITH SILICON-BASED ANODES

(71) Applicant: Apple Inc., Cupertino, CA (US)

(72) Inventors: Woo Cheol Shin, Campbell, CA (US); Hyea Kim, Campbell, CA (US); OuJung Kwon, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 549 days.

(21) Appl. No.: 17/851,135

(22) Filed: Jun. 28, 2022

(65) Prior Publication Data

US 2023/0420742 A1   Dec. 28, 2023

(51) Int. Cl.
| | | |
|---|---|---|
| *H01M 10/0569* | (2010.01) | |
| *H01M 4/38* | (2006.01) | |
| *H01M 4/583* | (2010.01) | |
| *H01M 10/0525* | (2010.01) | |
| *H01M 10/0567* | (2010.01) | |

(52) U.S. Cl.
CPC ....... *H01M 10/0569* (2013.01); *H01M 4/386* (2013.01); *H01M 4/583* (2013.01); *H01M 10/0525* (2013.01); *H01M 10/0567* (2013.01)

(58) Field of Classification Search
CPC ...... H01M 4/134; H01M 4/386; H01M 4/583; H01M 10/052; H01M 10/0525; H01M 10/0567; H01M 10/0568; H01M 10/0569; H01M 2300/0034; H01M 2300/0037; H01M 2300/0042; Y02E 60/10
See application file for complete search history.

(56) References Cited

U.S. PATENT DOCUMENTS

| | | | | |
|---|---|---|---|---|
| 2006/0003226 A1* | 1/2006 | Sawa | .......... | H01M 4/134 |
| | | | | 429/188 |
| 2019/0081360 A1* | 3/2019 | Yushin | .......... | H01M 10/0568 |
| 2019/0326641 A1* | 10/2019 | Dou | .......... | H01M 10/0567 |
| 2020/0350632 A1* | 11/2020 | Ha | .......... | H01M 10/4235 |
| 2022/0093970 A1* | 3/2022 | Goh | .......... | H01M 10/0565 |

FOREIGN PATENT DOCUMENTS

| | | | | |
|---|---|---|---|---|
| CN | 110416613 A | * | 11/2019 | |
| WO | WO-2007083583 A1 | * | 7/2007 | .......... H01M 10/052 |

OTHER PUBLICATIONS

"Guo et al, CN-110416613-A—Translated, Nov. 5, 2019" (Year: 2019).*
"Todorov et al., WO-2007083583-A1—Translated, Jul. 26, 2007" (Year: 2007).*

(Continued)

*Primary Examiner* — Milton I Cano
*Assistant Examiner* — Jesse J Efymow
(74) *Attorney, Agent, or Firm* — Young Basile Hanlon & MacFarlane, P.C.

(57) ABSTRACT

An electrochemical cell has an anode comprising a silicon-based active material, a cathode comprising a cathode active material, and an electrolyte. The electrolyte is formulated with a propionate-based solvent, a carbonate-based solvent, trifluoro toluene, a lithium salt with a molar concentration of 2.0 M or greater, and less than or equal to 5.0 wt. % of fluoroethylene carbonate.

6 Claims, 2 Drawing Sheets

(56) References Cited

OTHER PUBLICATIONS

"Jai et al., High-Performance Silicon Anodes Enabled By Nonflammable Localized High-Concentration Electrolytes, Jul. 9, 2019, Advanced Energy Materials, vol. 9" (Year: 2019).*

Cao, X., et al., "Review—Localized High-Concentration Electrolytes for Lithium Batteries", 2021 Journal of the Electrochemical Society, 168 010522 (14 pp).

Jia, H., et al., "High Performance Silicon Anodes Enabled By Nonflammable Localized High Concentration Electrolytes", Author Manuscript, doi: 10.1002/aenm.201900784, Jul. 9, 2019 (30 pp).

* cited by examiner

ELECTROLYTE FOR LITHIUM-ION BATTERIES WITH SILICON-BASED ANODES

TECHNICAL FIELD

This disclosure relates to electrolytes for lithium-ion batteries having silicon-based anodes, and a liquid electrolyte, and in particular, a liquid electrolyte formulated with a solvent comprising a propionate, a carbonate, and trifluoro toluene with fluoroethylene carbonate added at 5 wt. % or less.

BACKGROUND

The use of lithium-ion batteries has grown, and particularly, the use of lithium-ion batteries using silicon-based anode material. Silicon is used as anode material in lithium-ion batteries because silicon has a high theoretical capacity, providing batteries with improved energy density. Although the energy density of lithium-ion batteries has increased with the use of silicon-based anode material, the silicon-based material has limited cycle life due to the large volume changes that silicon-based materials undergo during battery cycling. These large volume changes, as large as 300%-400%, can result in fracture of silicon particles, isolated fragments of particles that no longer contribute to capacity, and a weak solid-electrolyte interphase (SEI) prone to cracking and delamination. This limited cycle life deters wider application of the technology.

SUMMARY

Disclosed herein are implementations of a liquid electrolyte formulated for use with a silicon-based anode material in a lithium-ion battery. The liquid electrolytes disclosed herein show improved performance in lithium-ion batteries with silicon-based anodes over conventional liquid electrolytes that use ethylene carbonate (EC) and/or other carbonates as a solvent and high concentrations of the additive fluoroethylene carbonate (FEC). The decay rate of the lithium-ion battery using the disclosed electrolytes decreases, projecting a much longer cycle life. The electrolytes disclosed herein provide an increase of over 200 cycles at 80% energy retention, while resulting in similar cycle resistance growth rates to conventional carbonate-based electrolytes at both 25° C. and 45° C.

Also disclosed and electrochemical cells and lithium-ion batteries utilizing the liquid electrolytes disclosed herein.

An electrochemical cell as disclosed herein has an anode comprising a silicon-based active material, a cathode comprising a cathode active material, and an electrolyte. The electrolyte is formulated with a propionate-based solvent, a carbonate-based solvent, trifluoro toluene, a lithium salt with a molar concentration of 2.0 M or greater, and less than or equal to 5.0 wt. % of fluoroethylene carbonate.

Another electrochemical cell as disclosed herein has an anode comprising a silicon-based active material having a volumetric capacity of ≥500 mAh/cc, a cathode comprising a cathode active material, and an electrolyte. The electrolyte is formulated with propyl propionate, ethylene carbonate, trifluoro toluene, LiFSI at a molar concentration of 2.0 M or greater, and less than or equal to 5.0 wt. % fluoroethylene carbonate.

In some formulations disclosed herein, the electrolyte may have between 0.5 wt. % and 3.0 wt. % fluoroethylene carbonate.

In some formulations disclosed herein, the electrolyte may include less than or equal to 10 wt. % of one or more additives. The one or more additives may be selected from the group consisting of phosphazene, vinylene carbonate, an oxalate-based additive, and a nitrile-based additive.

Variations in these and other aspects, features, elements, implementations, and embodiments of the electrolytes and electrochemical cells disclosed herein are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
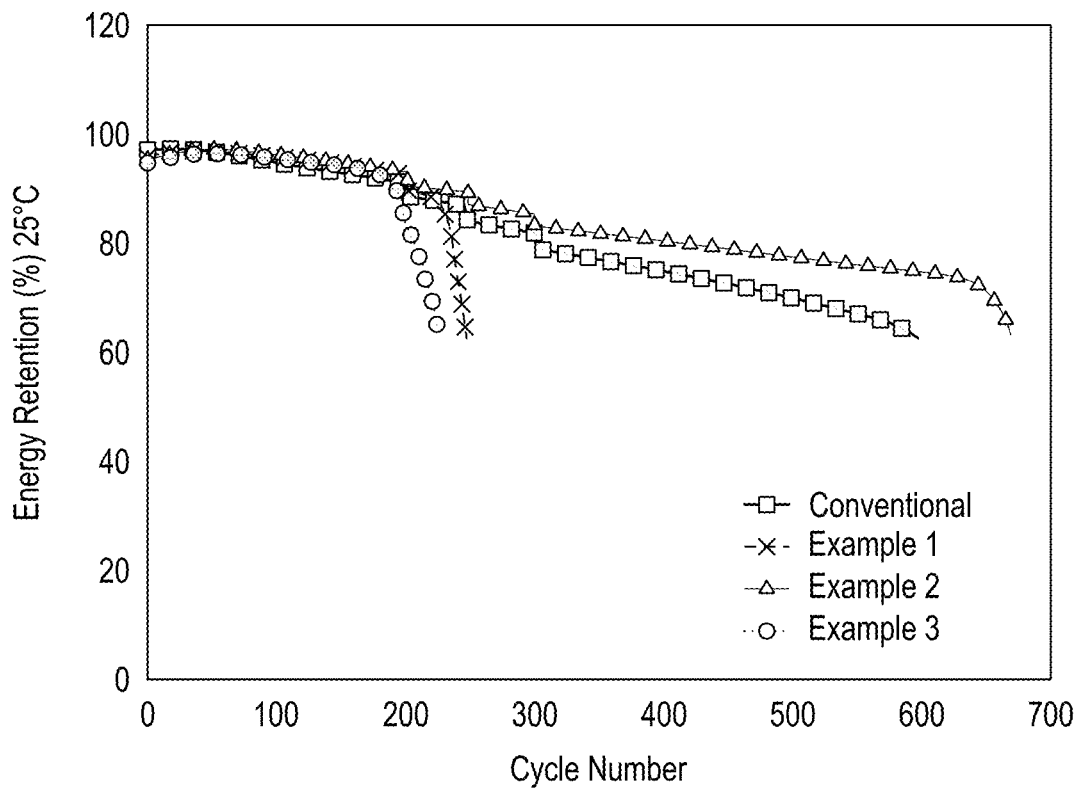
FIG. 1A is a graph of energy retention at 25° C. comparing an electrochemical cell using a conventional electrolyte and electrochemical cells using examples of electrolytes disclosed herein.

Silicon-based materials are used as anode active material in lithium-ion batteries because silicon has a high theoretical capacity, providing batteries with improved energy density. Although the energy density of lithium-ion batteries has increased with the use of silicon-based anode material, the silicon-based material has limited cycle life due to the large volume changes that silicon experiences during battery cycling. These large volume changes, as large as 300%-400%, can result in, as one example, a weakened solid-electrolyte interphase (SEI) prone to cracking and delamination when conventional electrolytes are used.

The SEI is formed by the decomposition of organic and inorganic compounds during cycling, such organic and inorganic compounds components of the liquid electrolyte used in the lithium-ion batteries. Conventional electrolytes made with common solvents, such as ethylene carbonate (EC), work well with graphite anodes, forming a passivation layer that allows lithium transport while preventing further reduction of the bulk electrolyte. However, EC-based electrolytes are intrinsically less stable with silicon. The structure of the SEI generated from the EC solvent cannot accommodate the repetitive and extensive swelling of the silicon in the anode during cycling.

Attempts have been made to address these issues by the introduction of additives. For example, fluoroethylene carbonate (FEC) in amounts in excess of 15 wt. % is needed to stabilize the performance of cells using silicon-based anodes across a wide temperature range. However, it has been found that additives at most delay the unavoidable decay of performance of such batteries. Once the additives are depleted, the fading of cell capacity occurs quickly. With this underlying incapability between the electrolyte and the silicon of the anode, the addition of functional molecules as additives to either or both the electrolyte and the anode material does not solve the degradation of the SEI interface, only postpones it.

Disclosed herein are liquid electrolytes formulated with a solvent consisting of a propionate-based solvent, a carbonate-based solvent, trifluoro toluene (TFT), and a highly concentrated lithium salt. The electrolytes disclosed herein also have a small amount of FEC, less than or equal to 5.0 wt. %, or between 0.5 wt % and 3.0 wt. %.

The disclosed electrolytes are formulated to increase the performance of lithium-ion batteries using a silicon-based active material. The silicon-based active material is not limited except to include some form of silicon or silicon alloy that has a volumetric capacity of greater than or equal to 500 mAh/cc. Examples of silicon-based active material can include, but are not limited to, silicon oxide ($SiO_x$) materials, carbon coated silicon active materials, and silicon alloy active materials. Graphite is not used as an active material, although some carbon may be used as a conductive agent, so long as the silicon-based active material has greater than or equal to 500 mAh/cc volumetric capacity. Conventional graphite anodes have a specific capacity of 372 mAh/g on average.

The disclosed electrolyte is showing improved performance in lithium-ion batteries with silicon-based anodes over conventional liquid electrolytes using EC and/or other carbonates as a solvent with high concentrations of FEC. With conventional electrolytes such as those using carbonate-based solvent, for example, the decay rate of silicon gradually increases, leading to an accelerating decay trend. In comparison, the decay trend is reduced when the conventional solvent is replaced with the solvent formulations disclosed herein. It is found that the decay rate of the lithium-ion battery using the disclosed electrolytes decreases, projecting a much longer cycle life. The electrolytes disclosed herein provide an increase of over 200 cycles at 80% energy retention, while resulting in similar cycle resistance growth rates to conventional carbonate-based electrolytes at both 25° C. and 45° C.

The propionate-based solvent can be one or more of propyl propionate (PP), ethyl propionate (EP), methyl propionate (MP) and butyl propionate (BP). The propionate-based solvent is 10% to 80% by volume of the electrolyte.

The carbonate-based solvent can be one or more of EC, propylene carbonate (PC), diethyl carbonate (DEC), dimethyl carbonate (DMC) and ethyl methyl carbonate (EMC). The carbonate-based solvent is 10% to 50% by volume of the electrolyte. The electrolytes disclosed herein have more of the propionate-based solvent by weight than the carbonate-based solvent.

The electrolyte formulations disclosed herein further include TFT at 5% to 50% by volume of the electrolyte, or between 25 wt. % and 35 wt. % of the electrolyte.

The electrolyte formulations disclosed herein can further include one or more of ethyl acetate, propyl acetate, methyl butyrate and ethyl butyrate.

The amounts and combinations of solvent are formulated for viscosity, ionic conductivity, and electrochemical and thermal stabilities. The resulting solvent enhances both the solubility of salt and the mobility of ions, simultaneously.

The lithium salt in the electrolyte can be lithium bis(fluorosulfonyl)imide (LiFSI) at a molar concentration of about 2.0 M or greater. LiFSI can be used alone or in combination with one or more lithium salts such as lithium hexafluorophosphate ($LiPF_6$) and lithium bis(trifluoromethanesulfonyl)imide (LiTFSI). The molar concentration of the additional lithium salt(s) is between about 0.01 M to about 0.5 M. All ranges provided herein are inclusive of the end values.

The electrolyte formulations may have no FEC or may include FEC up to 5.0 wt. % of the electrolyte. The optimum amount of FEC can be dependent on the type of silicon anode material used, the solvent formulation, and the operating temperatures. However, it has been found that amounts of FEC in excess of 5.0 wt. % are detrimental to the cycle life of a lithium-ion battery using a silicon-based anode material.

In embodiments of the electrochemical cell, the electrolyte may include an additive. The additive may be 10 wt. % or less of the electrolyte. In some embodiments, the additive may be 5 wt. % or less of the electrolyte. The additive may be one additive or a combination of additives. The additives may be, as non-limiting examples, phosphazene, vinylene carbonate (VC), oxalates, or nitriles such as succinonitrile (SN) and hexane tricarbonitrile (HTCN). The additives may be selected from the group consisting of phosphazene, VC, an ozalate-based additive, and a nitrile-based additive.

Example 1

The electrolyte formulation of Example 1 is 33 wt. % LiFSI, 32 wt. % PP, 30 wt. % TFT, and 2.4 wt. % EC, with the remaining wt. % being VC and HTCN. No FEC is used in the formulation of Example 1.

Example 2

The electrolyte formulation of Example 2 is 32 wt. % LiFSI, 32 wt. % PP, 30 wt. % TFT, 2.4 wt. % EC, and 1.0 wt. % FEC, with the remaining wt. % being VC and HTCN.

Example 3

The electrolyte formulation of Example 3 is 29 wt. % LiFSI, 28 wt. % PP, 30 wt. % TFT, 5.0 wt. % EC, and 5.0 wt. % FEC, with the remaining wt. % being VC and HTCN.

FIG. 1A is a graph comparing energy retention results at 25° C. for electrochemical cells using Example 1, Example 2, Example 3 and a conventional electrolyte. The conventional electrolyte was formulated using $LiPF_6$, EC, PC and DEC with 15 wt. % FEC. In the examples, the silicon anode was 85% $SiO_x$ with 15% binder and conductive carbon mixtures. The testing protocol was 0.2 C discharge capacity every $50^{th}$ cycle and 0.5 C discharge capacity for the other cycles.

Figure 1B:
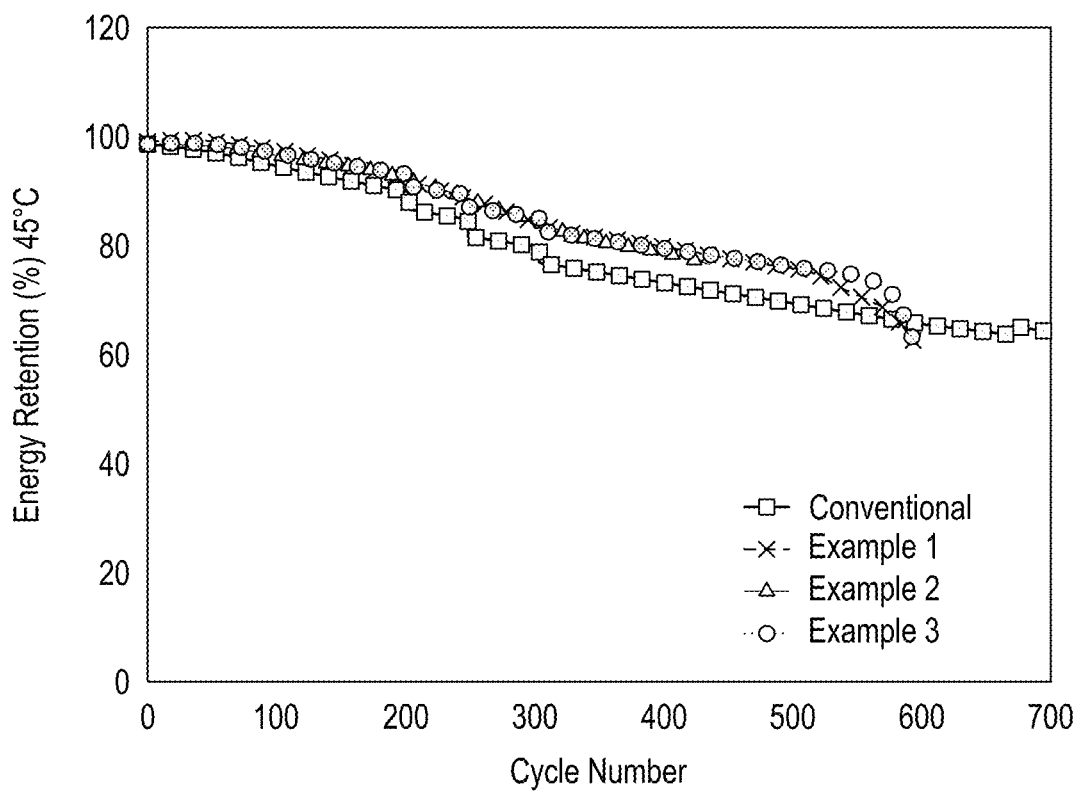
FIG. 1B is a graph of energy retention at 45° C. comparing the electrochemical cell using the conventional electrolyte and the electrochemical cells using the examples of electrolytes disclosed herein.

As seen in FIG. 1A, the electrochemical cell using Example 2 outperformed the electrochemical cell using the conventional electrolyte, providing over 200 more cycles at 80% of its retention. FIG. 1B is a graph comparing energy retention results at 45° C. for electrochemical cells using Example 1, Example 2, Example 3 and a conventional electrolyte. At 45° C., electrochemical cells using each of Examples 1, 2 and 3 respectively provided over 100 more cycles at 80% of their retention than the electrochemical cell using the conventional electrolyte.

Electrochemical cells using Examples 1, 2 and 3, respectively, also result in similar cycle resistance growth rates when compared to the cycle resistance growth rates of the electrochemical cell using the conventional electrolyte at both 25° C. and 45° C. In addition, the cell thickness measurements of the electrochemical cells using Examples, 1, 2 and 3, respectively, at both 25° C. and 45° C. are similar to the cell thickness measurements of the electrochemical cell using the conventional electrolyte. The electrolytes disclosed herein provide improved cycle life without negatively impacting cell thickness and resistance growth.

An aspect of the disclosed embodiments is a lithium-ion battery. The power generating element of the lithium-ion battery includes a plurality of unit electrochemical cell each including a cathode active material layer, an electrolyte as disclosed herein, and an anode active material layer containing a silicon-based active material. The cathode active material layer is formed on a cathode current collector and electrically connected thereto, and the anode active material layer is formed on an anode current collector and electrically connected thereto. A separator may be used, serving as a substrate, the electrolyte supported by the separator.

Figure 2:
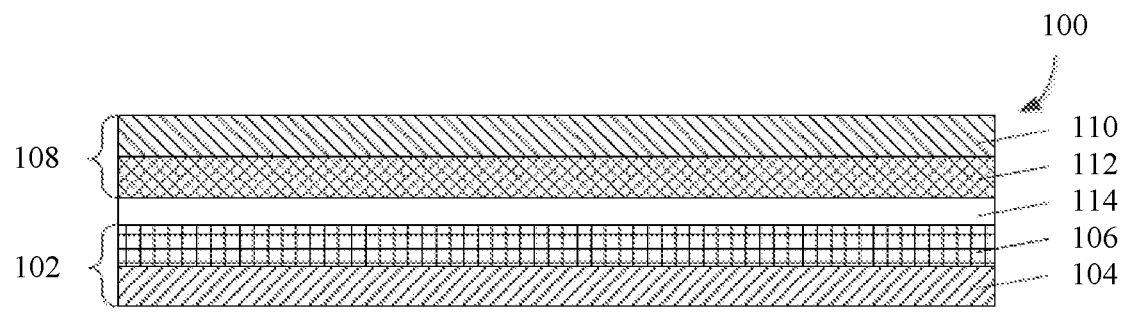
FIG. 2 is a schematic of an electrochemical cell as disclosed herein.

An electrochemical cell 100 is shown in cross-section in FIG. 2. The electrochemical cell 100 has an anode 102 with an anode current collector 104 and a silicon-based anode active material 106 disposed on the anode current collector 104. The electrochemical cell 100 also has a cathode 108 with a cathode current collector 110 and a cathode active material 112 disposed on the cathode current collector 110. The cathode 108 and the anode 102 are separated by a separator 114, if needed, and an electrolyte as disclosed herein.

The cathode current collector 110 can be, for example, an aluminum sheet or foil. Cathode active materials 112 are those that can occlude and release lithium-ions, and can include one or more oxides, chalcogenides, and lithium transition metal oxides which can be bonded together using binders and optionally conductive fillers such as carbon black. Lithium transition metal oxides can include, but are not limited to, $LiCoO_2$, $LiNiO_2$, $LiNi_{0.8}Co_{0.15}Al_{0.05}O_2$, $LiMnO_2$, $Li(Ni_{0.5}Mn_{0.5})O_2$, $LiNi_xCo_yMn_zO_2$, Spinel $Li_2Mn_2O_4$, $LiFePO_4$ and other polyanion compounds, and other olivine structures including $LiMnPO_4$, $LiCoPO_4$, $LiNi_{0.5}Co_{0.5}PO_4$, and $LiMn_{0.33}Fe_{0.33}Co_{0.33}PO_4$. As needed, the cathode active material 112 can contain an electroconductive material, a binder, etc.

The anode active material 106 is a silicon-based material as previously described. The silicon-based active material is not limited except to include some form of silicon or silicon alloy with a volumetric capacity of greater than or equal to 500 mAh/cc. Non-limiting examples of silicon-based anode material include Si, SiOx, and Si/SiOx composites. A conducting agent may be used. Further, one or more of a binder and a solvent may be used to prepare a slurry that is applied to the current collector, for example. The anode current collector 104 can be a copper or nickel sheet or foil, as a non-limiting example.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An electrochemical cell, comprising:
   an anode comprising a silicon-based active material having a volumetric capacity of 500 mAh/cc;
   a cathode comprising a cathode active material; and
   an electrolyte, comprising:
      a solvent consisting of:
         propyl propionate; ethylene carbonate; and trifluoro toluene;
      wherein the propyl propionate is between 25 wt. % and 35 wt. % of the electrolyte, the ethylene carbonate is between 1.0 wt. % and 10 wt. % of the electrolyte and wherein the trifluoro toluene is between 25 wt. % and 35 wt. % of the electrolyte;
      LiFSI at a molar concentration of 2.0 M or greater; and less than or equal to 5.0 wt. % fluoroethylene carbonate.

2. The electrochemical cell of claim 1, wherein the electrolyte comprises between 0.5 wt. % and 3.0 wt. % fluoroethylene carbonate.

3. The electrochemical cell of claim 1, wherein the electrolyte further comprises one or both of $LiPF_6$ or LiTFSI.

4. The electrochemical cell of claim 1, wherein the electrolyte further comprises: less than or equal to 10 wt. % of one or more additives.

5. The electrochemical cell of claim 4, wherein the one or more additives are selected from the group consisting of phosphazene, vinylene carbonate, an oxalate-based additive, and a nitrile-based additive.

6. The electrochemical cell of claim 4, wherein the one or more additives are vinylene carbonate and hexane tricarbonitrile.

* * * * *